(12) United States Patent
Wang

(10) Patent No.: US 6,372,984 B1
(45) Date of Patent: Apr. 16, 2002

(54) CONDUCTOR GALLOPING CONTROL DEVICE AND METHOD OF INSTALLATION

(75) Inventor: Jianwei Wang, Lawrenceville, GA (US)

(73) Assignee: Tyco Electronics Logistics AG (CH)

( * ) Notice: Subject to any disclaimer, the term of this patent is extended or adjusted under 35 U.S.C. 154(b) by 0 days.

(21) Appl. No.: 09/422,754

(22) Filed: Oct. 21, 1999

(51) Int. Cl.⁷ .............................................. H02G 7/00
(52) U.S. Cl. .................. 174/40 TD; 174/42; 174/45 TD
(58) Field of Search .............................. 174/40 TD, 42, 174/173, 12

(56) References Cited

U.S. PATENT DOCUMENTS

| | | | | |
|---|---|---|---|---|
| 2,172,810 A | * | 9/1939 | Sherman ...................... | 174/42 |
| 2,421,286 A | * | 5/1947 | Pyle ........................... | 174/173 |
| 2,897,256 A | * | 7/1959 | Kitselman et al. .......... | 174/173 |
| 3,069,491 A | * | 12/1962 | Hayden et al. ............. | 174/173 |
| 3,463,870 A | * | 8/1969 | Eucker ........................ | 174/42 |
| 3,501,116 A | * | 3/1970 | Eppinger et al. ............. | 248/63 |
| 4,620,059 A | | 10/1986 | Sherman ...................... | 174/42 |
| 4,741,097 A | * | 5/1988 | D'Agati et al. ............... | 29/631 |

FOREIGN PATENT DOCUMENTS

WO   WO 98/53542   11/1998

OTHER PUBLICATIONS

Brochure dated Jun., 1997 by Performed Line Products entitled Application Procedure & Safety Considerations, Preformed Line Products, Subheading Air Flow Spoiler, Hot Application, pp. 1, 2, 6, and 7.

Article from the Aug. 27th–Sept., 4th 1986 Session of the Cigré International Conference on Large High Voltage Electric Systems, entitled Galloping Suppression Tests on Overhead Lines, by P.H. Leppers, and T. J. Smart, p. 1 and 3.

* cited by examiner

*Primary Examiner*—Dean A. Reichard
*Assistant Examiner*—W. David Walkenhorst
(74) *Attorney, Agent, or Firm*—Kilpatrick Stockton LLP

(57) ABSTRACT

A galloping control rod for suppressing the vertical, torsional and horizontal movement associated with the galloping affect on aerial cables due to freezing rain, wet snow or frost deposits. The anti-galloping rod includes a non-conductive rod having a preformed helical midsection and a first and second end, the first end including a helical gripping section. The second end includes a one-half helical turn with a differing pitch length than the preformed helical midsection such that the conductor galloping control device can be installed on an aerial cable without having to slide the device along the cable or without the installer having to move his lifting device, such as a bucket lift, along the cable line.

12 Claims, 2 Drawing Sheets

CONDUCTOR GALLOPING CONTROL DEVICE AND METHOD OF INSTALLATION

FIELD OF THE INVENTION

This invention relates to vibration dampening devices and more specifically to a conductor galloping control device and a method for installation.

BACKGROUND OF THE INVENTION

Historically, there has been increased emphasis, worldwide, to develop practical solutions to the problem of vibration on overhead lines. There are several types of vibrations of overhead conductors, including galloping and aeolean vibration. Galloping vibration refers to a high amplitude low frequency vibration differing from an aeolean vibration which is defined as a low amplitude high frequency vibration. A number of devices, methods and techniques which have demonstrated successful suppression of vibration motion continue to be under close scrutiny by the electric power industry.

Galloping of overhead lines is associated with freezing rain, wet snow or frost which forms a deposit on conductors and changes their profile shape. With a moderate wind passing over this asymmetrical profile, the conductor may move in the vertical, torsional or horizontal direction initiating the galloping motion. The addition of devices that modify the position of ice accretion on the conductor so that the iced-conductor will present a changeable "angle of attack" to the wind direction have been developed to alleviate the gallop effect. By directly changing the angle of attack to the wind, one of the most active factors in a galloping system, the aerodynamic forces will not behave in such a way that upward velocity increases the vertical force and that downward velocity decreases the vertical force. The classic rise and fall effect that produces galloping is not allowed, thus self-sustained oscillations can be avoided.

Since 1979, extensive field experience has been gathered on an add-on helical straking device for the control of galloping; namely the air flow spoiler. In the past, spoilers were manufactured from nonmetallic rods of various diameters with an overall length of approximately 4.3 meters. Each end of the spoiler has a factory formed helical "gripping" section designed to fit tightly over a narrow range of conductor diameters. The straight section between the end gripping sections is field-wrapped tightly around the conductor twice to form a "spoiling" section with two helical turns.

U.S. Pat. No. 4,620,059, to Sherman, discloses a device for suppressing wind induced motion in aerial cables and a method for installing the device. The device comprises a fourteen foot straight rod with helical gripping ends on the distal and proximal end of the straight center portion. The distal end section is made up of a double helix and the proximal end includes a triple helix where the helical twist nearest the straight section has a larger inside diameter for installation purposes. Sherman also discloses a method for installing the device. Installation involves the hooking of the triple helix side of the device to the cable and sliding the device down the cable until the double helix side is in front of the installer. The installer then wraps the double helix side around the cable. Once the double helix end is secure, the installer then wraps the straight center portion around the cable twice. Finally, the installer moves to the triple helix end and wraps the triple helix around the cable completing installation.

The Sherman design is disadvantageous at least because of its overall length, initial straight portion and installation method. The overall length of the Sherman device is fourteen feet. At fourteen feet, the air spoiler is cumbersome for a single installer due to the flexible nature of the material used in manufacturing the rod. Furthermore, the manual twisting of the straight center portion around the cable during installation presents opportunity for injury because the straight rod must be manually twisted to conform to the cable. In addition, the installer must move a lift device, such as a bucket lift, from one end of the device to the other during installation to wrap each gripping end around the cable.

SUMMARY OF THE INVENTION

This invention is a conductor galloping control device for aerial conductors. The device has a middle disturbance section, a first gripping section and a second gripping section. The second gripping section is designed to facilitate installation. The middle disturbance section has preformed helixes with the same pitch length. All the turns in each section have the same helix diameter, but have different numbers of helical turns and differing pitch lengths. Pitch length is defined as the distance between a point on one helical turn and the corresponding point on the next helical turn.

It is a primary object of this invention to provide the aerial cable industry with a conductor galloping control device that is easier to install. It is a further object of this invention to provide a conductor galloping control device that is safer to install. An additional object of this invention is to provide a method for installing a conductor galloping control device by one person without having to move a lifting device, such as a bucket lift, during aerial installation. A farther object of this invention is to reduce the cost for the prevention of galloping by lowering the manufacturing costs due to the reduced length of the device. Still further objects and advantages will become apparent from a consideration of the ensuing description and drawings.

DETAILED DESCRIPTION OF THE DRAWINGS

Figure 1:
FIG. 1 is an elevation view of the conductor galloping control device.

FIG. 1 is an overall view of a conductor galloping control device 10. The conductor galloping control device 10 operates on a cable 18 (FIG. 2) by wrapping the preformed device 10 around the cable 18. The conductor galloping control device 10 consists of three sections, a first gripping section 12, a preformed disturbance midsection 14, and a second gripping section 16. The conductor galloping control device 10 is made from a non-conductive rod of suitable characteristics. In the preferred embodiment it is made from a non-conductive plastic material such as polyvinyl chloride. In another embodiment, the conductor galloping control device 10 may consist of two sections, a first gripping section 12 and a preformed disturbance midsection 14 that also performs as a gripping section.

In the preferred embodiment the conductor galloping control device 10 has an approximate length of 1.8 meters. The diameter of the rod varies depending on the application. The turns of the conductor galloping control device 10 have the same inside helix diameters but have different pitch lengths.

Both the first 12 and second 16 gripping sections have helical configurations preformed on device 10. The first gripping section 12 is formed with a one and one-half helical turn, but can be made with more or less full or partial turns. The second gripping section 16 is formed from a one-half turn, but it too can be formed by more or less full or partial turns. The pitch length of the first 12 and second 16 gripping sections differs from that of the preformed disturbance midsection 14. In addition, the pitch length of the helical turns in each gripping section can vary from turn to turn. The disturbance midsection 14 contains preformed helical turns; for example, the preferred embodiment contains two preformed helical turns. However, the number of preformed helixes in the preformed disturbance midsection 14 varies with the overall length of the conductor galloping control device 10. The longer the conductor galloping control device 10, the greater the number of helical turns in the preformed disturbance midsection 14. The inner helix diameter of the gripping sections 12 and 16 may vary in size depending on the application, but typically are sized so that the conductor galloping control device 10 securely mounts to the cable 18 on which device 10 operates.

Figure 2:
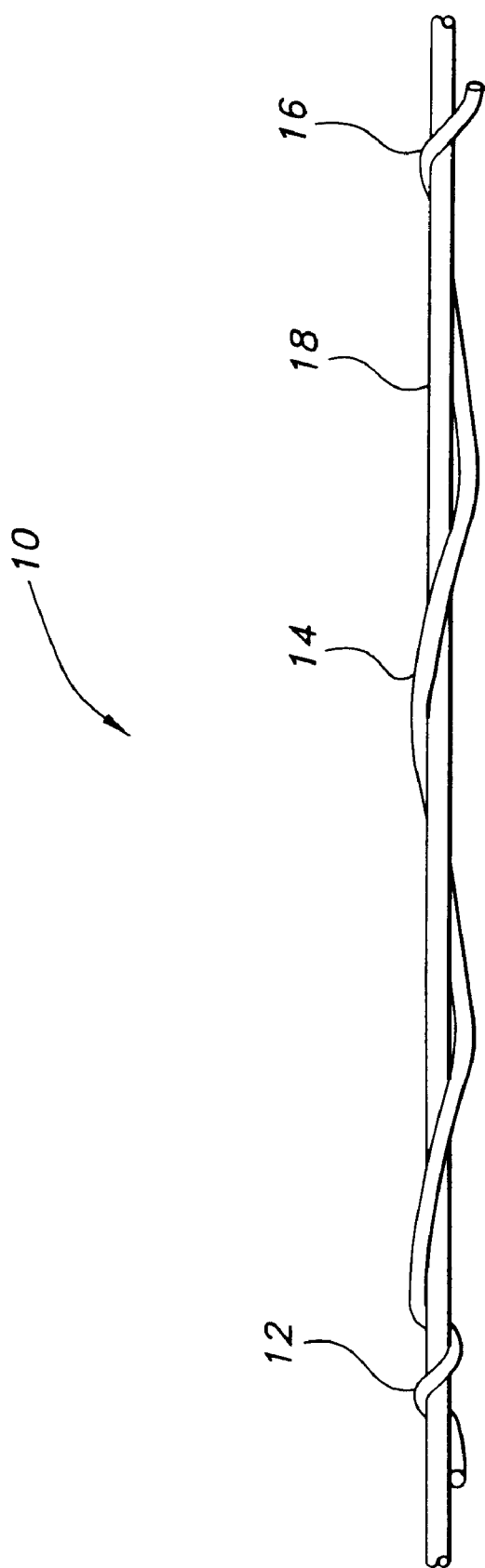
FIG. 2 is an elevation view of the conductor galloping control device of FIG. 1 mounted on an aerial cable.

FIG. 2 shows the conductor galloping control device 10 installed on a cable 18. Installation is easily accomplished by hanging the second gripping section 16 on the cable 18 and wrapping the cable with the preformed disturbance midsection 14. Once the midsection is put in place, the installer then wraps the first gripping section 12 around the cable to complete the installation. Since the conductor galloping control device 10 may be only 1.8 meters in length (but in any event typically is substantially shorter than fourteen feet) and has a preformed midsection 14, a single installer can easily perform the installation without help or having to move his position along the aerial cable. The installation method therefore reduces at least some of the risk associated with other methods in use today.

The foregoing is provided for purposes of illustrating, explaining, and describing embodiments of the present invention that provide a device for preventing galloping of aerial cables and an installation method that can be performed by a single installer. Modifications and adaptations to these embodiments will be apparent to those skilled in the art and may be made without departing from the scope or spirit of the invention.

What is claimed is:

1. A conductor galloping control device comprising:
   a rod having a preformed helical midsection; and
   a first and a second end, each with a gripping section having a differing pitch length than the preformed helical midsection, such that the second gripping section comprises no more than an approximate one-half helical turn.

2. The conductor galloping control device of claim 1, such that the number of helixes in the preformed helical midsection varies with the overall length of the conductor galloping control device.

3. The conductor galloping control device of claim 1, such that the first gripping section has a plurality of helical turns.

4. The conductor galloping control device of claim 3, such that the pitch length varies among the helical turns in the first gripping section.

5. A conductor galloping control device comprising:
   a rod having a preformed helical midsection; and
   a first and a second end, each with a gripping section having a differing pitch length than the preformed helical midsection, such that the first gripping section comprises no more than an approximate one and one-half helical turn.

6. The conductor galloping control device of claim 5, such that the number of helixes in the preformed helical midsection varies with the overall length of the conductor galloping control device.

7. The conductor galloping control device of claim 5, such that the second gripping section has a plurality of helical turns.

8. The conductor galloping control device of claim 7, such that the pitch length varies among the helical turns in the second gripping section.

9. A conductor galloping control device comprising:
   a rod having a preformed helical midsection; and
   a first and a second end, each with a gripping section having a differing pitch length than the preformed helical midsection, such that the pitch length of the first gripping section differs from the pitch length of the second gripping section.

10. A method for installing on an aerial cable an anti-galloping rod having a helical midsection, a first helical gripping section on one end of the rod, and a second helical gripping section on the other end of the rod, comprising:
    hanging the second helical gripping section on the aerial cable;
    wrapping the preformed helical midsection about the cable; and
    securing the first gripping section on the cable.

11. The method of claim 10, in which securing the first gripping section on the cable occurs without an installer having to:
    install the second helical gripping section by wrapping it around the cable; and
    slide the device along the cable to reach the first gripping section of the device.

12. The method of claim 10, in which securing the first gripping section on the cable occurs without an installer having to move a lifting device during installation.

* * * * *